United States Patent
Aerts et al.

(10) Patent No.: US 10,815,373 B2
(45) Date of Patent: Oct. 27, 2020

(54) THERMOSET RESIN COMPOSITE MATERIALS COMPRISING INTER-LAMINAR TOUGHENING PARTICLES

(71) Applicant: CYTEC INDUSTRIES INC., Princeton, NJ (US)

(72) Inventors: Vincent Aerts, Wrexham (GB); Mark Bonneau, Brea, CA (US); Judith Elder, Gateshead (GB); Emiliano Frulloni, Rossett (GB); James Martin Griffin, Santa Ana, CA (US)

(73) Assignee: CYTEC INDUSTRIES INC., Princeton, NJ (US)

(*) Notice: Subject to any disclaimer, the term of this patent is extended or adjusted under 35 U.S.C. 154(b) by 0 days.

(21) Appl. No.: 16/256,005

(22) Filed: Jan. 24, 2019

(65) Prior Publication Data

US 2019/0169422 A1     Jun. 6, 2019

Related U.S. Application Data

(62) Division of application No. 14/076,640, filed on Nov. 11, 2013, now abandoned.
(Continued)

(51) Int. Cl.
*C08L 63/00* (2006.01)
*C08L 77/02* (2006.01)
(Continued)

(52) U.S. Cl.
CPC ............. *C08L 63/00* (2013.01); *C08G 59/32* (2013.01); *C08G 59/3227* (2013.01);
(Continued)

(58) Field of Classification Search
CPC ......... C08L 63/00–10; C08L 77/00–12; C09D 163/00–10; C09D 177/00–12;
(Continued)

(56) References Cited

U.S. PATENT DOCUMENTS 3,472,730 A    10/1969   Frigstad
3,926,904 A    12/1975   Scola
(Continued)

FOREIGN PATENT DOCUMENTS

EP    0486197 A2    5/1992
EP    0486197 A3    5/1992
(Continued)

OTHER PUBLICATIONS

Scifinder properties of CAS 31305-94-9 (2020).*
(Continued)

*Primary Examiner* — Kregg T Brooks
(74) *Attorney, Agent, or Firm* — Thi Dang

(57) ABSTRACT

A resin system containing:
(i) a thermosetting resin precursor component comprising one or more multi-functional epoxy resin precursor(s) having a functionality of at least three, preferably wherein said precursor(s) are selected from a tri-functional epoxy resin precursor and/or a tetra-functional epoxy resin precursor;
(ii) a thermoplastic polyamide particle component wherein the polyamide particles have a melting temperature $T_{PA}$; and
(iii) one or more curing agent(s),
wherein the resin precursor component, the thermoplastic particle and the curing agent(s) are selected such that gelation of the epoxy matrix during the cure cycle of the resin system occurs at a gelation temperature $T_{GEL}$ which is at or below $T_{PA}$.

4 Claims, 7 Drawing Sheets

Related U.S. Application Data

(60) Provisional application No. 61/726,596, filed on Nov. 15, 2012.

(51) Int. Cl.

| | | |
|---|---|---|
| *C08L 77/06* | (2006.01) | |
| *C08G 59/32* | (2006.01) | |
| *C08G 59/40* | (2006.01) | |
| *C08K 5/00* | (2006.01) | |
| *C08K 5/41* | (2006.01) | |

(52) U.S. Cl.
CPC ............ *C08G 59/40* (2013.01); *C08K 5/0025* (2013.01); *C08K 5/41* (2013.01); *C08L 77/02* (2013.01); *C08L 77/06* (2013.01)

(58) Field of Classification Search
CPC ........ C09J 163/00–10; C09J 177/00–12; C08J 2363/00–10; C08J 2477/00–12; C08J 5/24; C08G 59/00–72
See application file for complete search history.

(56) References Cited

U.S. PATENT DOCUMENTS

| | | |
|---|---|---|
| 4,500,660 A | 2/1985 | Minamisawa et al. |
| 4,539,253 A | 9/1985 | Hirschbuehler et al. |
| 4,604,319 A | 8/1986 | Evans et al. |
| 4,656,207 A | 4/1987 | Jabloner et al. |
| 4,783,506 A | 11/1988 | Gawin |
| 4,954,195 A | 9/1990 | Turpin |
| 4,957,801 A | 9/1990 | Maranci et al. |
| 4,999,238 A | 3/1991 | Gawin |
| 5,028,478 A | 7/1991 | Odagiri et al. |
| 5,087,657 A | 2/1992 | Qureshi et al. |
| 5,169,710 A | 12/1992 | Qureshi et al. |
| 5,242,748 A | 9/1993 | Folda et al. |
| 5,266,610 A | 11/1993 | Malhotra et al. |
| 5,268,223 A | 12/1993 | Qureshi et al. |
| 5,276,106 A | 1/1994 | Portelli et al. |
| 5,523,351 A * | 6/1996 | Colvin ................ C08G 18/728 525/124 |
| 6,013,730 A | 1/2000 | McGrail et al. |
| 6,063,839 A | 5/2000 | Oosedo et al. |
| 6,117,551 A | 9/2000 | Nagata et al. |
| 6,437,080 B1 | 8/2002 | McGrail et al. |
| 7,649,060 B2 * | 1/2010 | Li .......................... C08G 18/10 525/526 |
| 7,754,322 B2 | 7/2010 | Tilbrook et al. |
| 2004/0044141 A1 | 3/2004 | McGrail et al. |
| 2010/0222461 A1 | 9/2010 | Bongiovanni et al. |
| 2011/0259514 A1 | 10/2011 | Boyle |
| 2014/0087178 A1* | 3/2014 | Arai .......................... B32B 5/04 428/327 |
| 2015/0166736 A1 | 6/2015 | Pineau |

FOREIGN PATENT DOCUMENTS

| | | |
|---|---|---|
| EP | 0311349 B1 | 9/1996 |
| GB | 2257144 A | 1/1993 |
| JP | 2006169541 A | 6/2006 |
| JP | 2015528030 A | 9/2015 |
| WO | 2006077153 A2 | 7/2006 |
| WO | 2006077153 A3 | 7/2006 |
| WO | 2008130484 A1 | 10/2008 |
| WO | 2010136772 A1 | 12/2010 |

OTHER PUBLICATIONS

Scifinder properties of CAS 25667-42-9 (Year 2018).
Wypych, Handbook of Polymers (2012).
Sumitomo Chemical Co. Ltd., SumikaExel PES High Heat Resistance Amorphous Polymer Technical Note (2010).

\* cited by examiner

THERMOSET RESIN COMPOSITE MATERIALS COMPRISING INTER-LAMINAR TOUGHENING PARTICLES

This application is a divisional application of U.S. application Ser. No. 14/076,640 filed on Nov. 11, 2013, which claims the benefit of U.S. Provisional Patent Application No. 61/726,596 filed on Nov. 15, 2012, both of which are incorporated by reference in their entirety.

The present invention is concerned with composite materials comprising thermoplastic inter-laminar toughening (ILT) particles to provide morphology stabilization and reduce or eliminate micro-cracking during curing.

BACKGROUND

Composite materials comprising fibre-reinforced thermosetting resins have long been used in the manufacture of load-bearing components suitable for use in transport applications (including aerospace, aeronautical, nautical and land vehicles) and in building/construction applications. Thermoset materials such as cured epoxy resins are known for their thermal and chemical resistance. They also display good mechanical properties but they frequently lack toughness and tend to be very brittle. This is especially true as their crosslink density increases or the monomer functionality increases above two.

For high performance applications, the composite material comprising a continuous resin matrix and continuous reinforcing fibres is typically used in the form of a pre-preg, in which the reinforcing fibres are pre-impregnated with a controlled amount of uncured resin, and which is suitable for moulding and curing into the final composite part. The reinforcing fibres may either be woven in a multi-directional fabric or oriented parallel in a uni-directional (UD) tape. In the aerospace industry, prep-pregs are the preferred materials for critical load-bearing applications including, but not limited to, wings and fuselage, which require simultaneously high specific strength, impact resistance, and damage tolerance.

In general terms, the mechanical performances of the cured composite are a function of the individual properties of the reinforcing fibre and the matrix resin, and the interaction between these two components. The resin content is also an important factor.

The mechanical performance of pre-preg systems is typically measured in terms of tensile performance (open hole tensile (OHT) strength), compressive performance (open hole compression (OHC) strength), impact resistance (compression strength after impact (CSAI)) and damage tolerance ($G_{I/IIC}$: inter-laminar fracture toughness in mode I and mode II, respectively).

A further important property of pre-preg systems is their hot-wet compressive performance (hot-wet open hole compression (HW-OHC) strength), by which is meant the way in which the OHC strength decreases at elevated temperatures after a prolonged exposure to moisture. The OHC strength of existing pre-preg systems is typically fairly constant below room temperature (for instance from room temperature (21° C.) down to about −55° C.) but can deteriorate significantly at elevated temperatures (for instance 70° C.) when saturated with moisture.

In many applications it is desirable to maximise tensile strength. Unfortunately, increasing OHT strength is usually accompanied by a decrease in OHC strength, and in particular HW-OHC strength, which is a critical design value for aerospace applications. Similarly, increasing HW-OHC strength is usually accompanied by a decrease in OHT strength, but more importantly, it usually impacts badly upon impact resistance (CSAI) and/or damage tolerance ($G_{IIC}$) which are key requirements for flight critical parts in aerospace applications.

With the aim of improving CSAI and $G_{IIC}$ performances of pre-preg systems, two main strategies have been used over the past few decades: increasing the intrinsic resin toughness and toughening the inter-laminar region.

To improve the intrinsic resin toughness, the addition of rubber and/or thermoplastic to the resin formulation has been used for many years. For example, U.S. Pat. Nos. 3,926,904 and 4,500,660 both disclose that functionalized acrylonitrile-butadiene rubbers are efficient toughening agents for epoxy resin systems. These rubbers have been shown to be initially soluble in the uncured epoxy resin systems and undergo a RIPS (reaction-induced phase separation) during cure to form "in-situ" rubber-rich particles in the cured systems. Although these rubbers were proven effective toughening agents, they generally decreased the HW-OHC strength of the pre-pregs, which limited their use for aerospace applications.

Alternatively, U.S. Pat. No. 4,656,207 discloses that thermoplastics, such as polyethersulfones, could advantageously be used instead of the aforementioned rubbers to increase the toughness of epoxy resin systems without significant loss of hot-wet performances. This renders these thermoplastics the preferred toughening agent for epoxy resin systems targeting aerospace applications. Similarly to the aforementioned rubbers, these thermoplastics are initially soluble in the uncured epoxy resins and subsequently undergo a RIPS during cure.

Regarding the targeted toughening of the inter-laminar region itself, U.S. Pat. No. 3,472,730 discloses that interleaving the reinforcing fibre layers with a rubber-toughened resin system can significantly improve impact resistance of pre-pregs. Hirschbuehler et al. further disclose in U.S. Pat. No. 4,539,253 that a key aspect to achieve high impact resistance is to maintain the integrity of this discrete inter-laminar layer (also commonly referred to as interleaf layer). Hirschbuehler et al. disclose that lightweight continuous or discontinuous fibrous mats or scrims can be used to control the integrity of this inter-laminar region, thus providing pre-pregs with greatly improved impact resistance and damage tolerance. However, the use of rubber as toughening agent in the inter-laminar layer significantly impacted hot-wet performances.

U.S. Pat. Nos. 4,783,506 and 4,999,238 disclose another approach to enhance impact resistance by the insertion of infusible rubber particles of diameter comprised between 10 to 75 microns in the inter-laminar region. These rubber particles were sufficiently large to be filtered on the surface of the reinforcing fibres layer during the manufacture of the pre-pregs. Although infusible, they were capable of swelling in the resin. U.S. Pat. Nos. 5,266,610 and 6,063,839 disclose core-shell rubber particles for the same purpose.

Evans et al. in U.S. Pat. No. 4,604,319 showed that by concentrating thermoplastic in the inter-laminar layer instead of rubber as toughening agent, impact resistance can be improved without significant impact on hot-wet performances. In accordance with this concept, Evans et al. disclose the use of a thermoplastic inter-laminar layer, the latter optionally comprising up to 40% by weight of a modifying thermosetting resin system. The thermoplastic can be selected from a range of engineering thermoplastic such as polyamide, polyimide or polyether imide. In addition, Evans et al. also disclose the potential use of reinforcing additives in the thermoplastic inter-laminar layer such a scrim, chopped fibres, and particulates.

U.S. Pat. No. 5,276,106 discloses the use of soluble thermoplastic particles which would remain mainly insoluble at pre-preg manufacturing temperatures but would later dissolve into the resin system at curing temperatures. These particles are sufficiently large to be filtered on the surface of the reinforcing fibres during manufacture and the dissolution thereof occurring during cure enriches the inter-leaf layer in thermoplastic. The use of thermoplastic in the form of particles instead of an interleaf layer provides much improved tack and drape. These thermoplastic particles can be selected from a range of amorphous thermoplastics having a Tg above 140° C. such as polyether sulfone or polyether imide.

In U.S. Pat. No. 4,957,801, Maranci et al. disclose the use of insoluble thermoplastic particles. The thermoplastic particles constitute between 20% and 80% by volume of the inter-laminar region and are characterized by a diameter ranging from 2 to 100 microns. These particles remain insoluble during the pre-preg manufacture and curing cycle and are sufficiently large to be filtered on the surface of the reinforcing fibres layer. The insolubility of these thermoplastic particles helps maintaining the integrity of a discrete inter-laminar layer to achieve further impact resistance. These thermoplastic particles can be selected from a range of engineering thermoplastic such as polyether sulfone, polyamide or polyimide.

In U.S. Pat. No. 5,242,748, Folda et al. disclose the use of polyimide which must remain insoluble at processing temperature but must swell or partially dissolve at curing temperature while retaining a certain integrity. Folda et al. disclose that if either no swelling or partial dissolution occurs, or if full dissolution occurs as proposed by Turpin in U.S. Pat. No. 4,954,195, only a lower increase in impact resistance will be achieved.

In WO-2010/136772, Baidak et al. disclose the use of partially cross-linked polyether sulfone particles to better control swelling and partial dissolution of the thermoplastic particles while retaining the particle integrity during cure.

Polyamide particles have also been explored for toughening ability. U.S. Pat. No. 5,028,478 discloses the use of amorphous transparent polyamide particles. In U.S. Pat. No. 5,169,710 and in U.S. Pat. No. 5,268,223, Qureshi et al. disclose the use of porous polyamide particles. U.S. Pat. No. 7,754,322 discloses the use of a blend of non-amorphous polyamide particles, one having a temperature of melting above the cure temperature and the other a temperature of melting at or below the curing temperature.

In U.S. Pat. No. 5,087,657, Qureshi et al. disclose the use of polyphenylene ether thermoplastic particles. However, experience has evidenced that these thermoplastic particles are prone to micro-cracking which greatly limit their applicability.

Micro-cracking can occur within the thermoplastic or at the interfaces between the thermoset resin matrix and a thermoplastic component of the resin system (i.e. de-bonding between the matrix and the thermoplastic domain). Resistance to micro-cracking is another key property of pre-pregs. Micro-cracking tends to be associated with reduced fatigue resistance and reduced fluid resistance since the presence of micro-cracks increases the percolation pathways for, for example, moisture or solvent.

A further important property of pre-preg systems is their "out-life", which is sometimes resolved into a "handling out-life" and a "mechanical out-life". The handling out-life is the length of time an uncured pre-preg can be stored at room temperature (around 21° C.) and retain sufficient tack. The "tack" of an uncured pre-preg is a measurement of the capability of an uncured pre-preg to adhere to itself and to mould surfaces, and is an important factor during lay-up and moulding operations, in which pre-pregs are formed into laminates which are subsequently cured to form the composite part. The mechanical out-life is the length of time an uncured pre-preg can be stored at room temperature (around 21° C.) and retain sufficient flow to allow the manufacture composite parts of acceptable quality.

The standard and preferred curing agent in epoxy-based pre-pregs for high performances aerospace applications is 4,4'-diaminodiphenyl sulphone (DDS), which is known to provide simultaneously good OHT strength, CSAI and $G_{I/IIC}$ performances relative to other curing agents, as well as good out-life.

While some conventional pre-preg systems containing crystalline polyamide particles have managed to increase both impact resistance (CSAI) and damage tolerance ($G_{I/IIC}$) simultaneously, this has adversely affected hot-wet compressive performance (OHC strength). Other pre-preg systems have optimised compressive performance (OHC strength) at the expense of impact resistance (CSAI) and damage tolerance ($G_{I/IIC}$). In conventional resin systems, it has proven extremely difficult to optimise these aspects simultaneously. It would be desirable to maximise compressive performance without detriment to at least CSAI, and preferably without detriment to CSAI and $G_{I/IIC}$.

Another problem with conventional resin systems comprising crystalline polyamide particles is the degree to which mechanical performance can be dependent upon the temperature ramp rate used during curing. In particular, the inventors have observed that mechanical performance, morphology and micro-cracking in such systems are strongly dependent upon the curing rate used during manufacture of pre-preg laminates. Such temperature-dependence is very disadvantageous, particularly for large structures, and this lack of process robustness greatly limits the use of such particles as inter-laminar toughening agents in conventional pre-pregs, despite the attractiveness of such ILT particles in terms of CSAI and $G_{I/IIC}$ improvements. It would be highly desirable to provide a resin system which cures in substantially the same manner across a range of temperature ramp rates.

Thus, pre-pregs having excellent or improved impact resistance and damage tolerance combined with excellent or improved compressive performances would present a useful advance in the art, particularly if the morphology necessary to achieve these performances can be maintained over a wide range of processing conditions, which would eliminate the need for an impractical degree of control during part manufacture as well as ensuring performance reliability. Such improved pre-pregs could find rapid acceptance, particularly in the aerospace industry, displacing the current less robust pre-preg systems.

DETAILED DESCRIPTION

Figure 1:
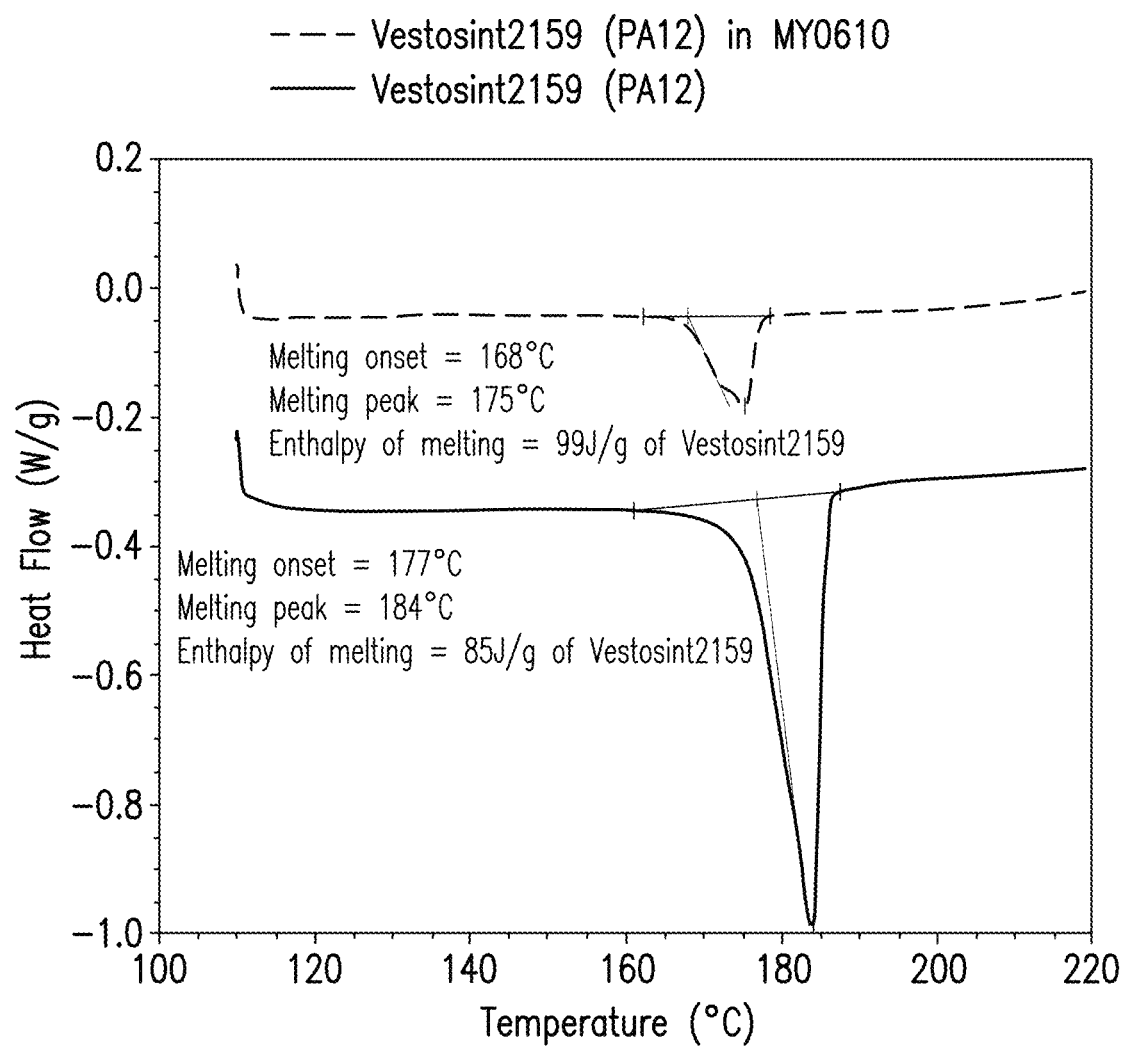
FIG. 1 provides DSC thermograms for showing the knockdown effect of the presence of m-TGAP epoxy resin on the melting peak of a polyamide particle.

It is an object of this invention to provide a composite material displaying excellent or improved compressive performance (OHC strength), particularly hot-wet OHC strength, without significant detriment to CSAI performance and/or $G_{I/IIC}$ performance, particularly wherein micro-cracking in the inter-laminar region is reduced or eliminated.

It is a further object of this invention to provide a composite material displaying excellent or improved CSAI performance simultaneously with excellent or improved $G_{I/IIC}$ performance without significant detriment to compressive performance (OHC strength), particularly hot-wet OHC strength, particularly wherein micro-cracking in the inter-laminar region is reduced or eliminated.

Thus, it is a further object of this invention to provide a composite material displaying excellent or improved CSAI performance simultaneously with excellent or improved $G_{I/IIC}$ performance in combination with excellent or improved compressive performance (OHC strength) particularly hot-wet OHC strength, particularly wherein micro-cracking in the inter-laminar region is reduced or eliminated.

It is a further object of this invention to provide a resin system comprising ILT particles which is able to provide such mechanical performance wherein the dependence upon the temperature ramp rate typically used during curing is reduced or eliminated.

Accordingly, the present invention provides a resin system comprising:
  (i) a thermosetting resin precursor component comprising one or more multi-functional epoxy resin precursor(s) having a functionality of at least three, preferably wherein said precursor(s) are selected from a tri-functional epoxy resin precursor and/or a tetra-functional epoxy resin precursor;
  (ii) a thermoplastic particle component comprising polyamide particles having a melting temperature $T_{PA}$; and
  (iii) one or more curing agent(s),
wherein said resin precursor component, said thermoplastic particle and said curing agent are selected such that gelation of the epoxy matrix during the cure cycle of the resin system occurs at a gelation temperature $T_{GEL}$ which is at or below $T_{PA}$.

Thus, for a resin system which is thermally curable using a curing temperature $T_C$ which is attained with a cure ramp rate $R_{CR}$, gelation of the epoxy matrix during the cure cycle occurs at a gelation temperature $T_{GEL}$ which is at or below $T_{PA}$, particularly for cure ramp rates $R_{CR}$ up to about 3.0° C./min (particularly up to about 2.5° C./min, and in one embodiment up to about 2.0° C./min, and particularly in the range of 0.05° C./min to 3.0° C./min, particularly in the range of 0.05° C./min to 2.5° C./min, and in one embodiment in the range of 0.05° C./min to 2.0° C./min), particularly for curing temperatures $T_C$ in the range of from 140° C. to 200° C. (particularly from 160° C. to 195° C., and more preferably from 170° C. to 190° C.). Preferably, the cure ramp rates $R_{CR}$ is at least about 0.1° C./min, and preferably at least about 0.5° C./min. Preferably, gelation of the epoxy matrix during the cure cycle of the resin system occurs at a gelation temperature $T_{GEL}$ which is below $T_{PA}$.

The particular combination of components in the resin system of the present invention provides morphology stabilisation and resistance to micro-cracking, which is surprisingly insensitive to the temperature ramp rate during cure (as used, for example, during part manufacturing). Thus, the resin systems of the present invention allow processing at both high and low cure ramp rates (and particularly at the cure ramp rates $R_{CR}$ noted above), thus providing process robustness.

In particular, the combination of a highly cross-linked epoxy resin matrix with a curing agent of relatively high reactivity has been found to reduce or eliminate the temperature ramp rate-dependence of the inter-laminar morphology, in a manner which stabilises and preserves the particulate morphology (which is used herein to refer to the mechanical integrity and shape of the particle) of the polyamide ILT particles and reduces or eliminates micro-cracking, even when cured at a high heating rate (for instance up to about 3.0° C./min).

The combination of highly cross-linked epoxy resin matrix with a curing agent of relatively high reactivity promotes gelation of the resin matrix prior to any melting of the polyamide particle during cure, which the inventors believe is the key mechanism in stabilising particle morphology and reducing/eliminating micro-cracking, even at high temperature ramp rates. Thus, the use of a curing agent with relatively high reactivity in combination with the formulation of a highly cross-linked system is able to achieve the object of the present invention.

The particle-containing resin systems of the present invention maintain the excellent mechanical performance in terms of CSAI and $G_{I/IIC}$, while offering improved OHC, in particular HW-OHC, and reducing or eliminating the dependence upon the temperature ramp rate during curing, thereby providing the significant advantage of process robustness in terms of morphology and micro-cracking.

In accordance with the general meaning of the term in the art, the term gelation temperature $T_{GEL}$ (also referred to herein as gel-temperature or gel-point) is the temperature at which the viscosity of the resin system tends to infinity, and can be identified by dynamic rheology. In a preferred embodiment of the present invention, the term gelation temperature $T_{GEL}$ is considered as the temperature at which the viscosity of the resin system reaches 1000 Pa·s. On a molecular level, gelation is the incipient formation of a cross-linked network, and a thermosetting resin loses its ability to flow above its gel-point. The kinetics of gelation are dependent on the functionality, reactivity and stoichiometry of the reactants, and can be modulated by the temperature profile of the cure cycle. Thus, for instance, increasing the functionality of an epoxy resin precursor will increase the cross-link density, typically leading to an earlier gelation, all other factors being equal. Similarly, increasing the stoichiometry curing agent relative to the amount of epoxy resin precursor (for instance from 0.9 to 1.0), typically results in an earlier gelation. The macroscopic consequence of gelation is the rapid approach towards infinite viscosity, and it is the viscosity which may be measured to identify the gel-point. In a dynamic rheology measurement, the gel-point is the crossover of the viscous (G") and elastic (G') moduli. Thus, G"/G'>1 defines viscous (liquid) behaviour; the gel-point is defined as the loss tangent (tan δ)=G"/G'=1; and G"/G'<1 defines elastic (solid) behaviour.

The Thermoplastic Particle Component

The resin systems of the present invention achieve a locally high concentration of thermoplastic particles in the inter-laminar region, thereby increasing the toughness of the pre-preg laminate. The particles may be detected using scanning electron microscopy (SEM) or optical microscopy.

The combination of components in the resin system of the present invention promotes gelation of the resin matrix prior to melting of the thermoplastic polyamide particles, even at high cure ramp rates. The thermoplastic particles described herein for use in the resin systems of the present invention remain insoluble in the epoxy resin matrix during the cure cycle and retain their initial particulate morphology, which increases the toughness and damage tolerance of the thermoset resin and composite material. The particles retain their mechanical integrity during the blending, curing and handling process of the resin and pre-preg. The avoidance of coalescence of the molten polyamide particle within the epoxy matrix reduces or eliminates the formation of micro-cracking at the particle/matrix interface. Moreover, retaining discrete polyamide particles rather than a coalesced polyamide continuous phase or network is beneficial for the hot-wet performance of the cured resin.

The amount of thermoplastic particles in the resin system is preferably in the range of from about 2.5 to about 30 wt %, more preferably in the range of from about 5 to about 25 wt %, relative to the total weight of the resin system (i.e. the total weight of the thermosetting resin precursor(s), the ILT thermoplastic particles, the curing agent(s) and any optional additional toughening agent(s))

The thermoplastic particles used in the resin system preferably have an average particle size of about 2 to about 75 μm, preferably from about 5 to about 50 μm, and typically preferably from about 10 to about 30 μm.

The thermoplastic polyamide particles are suitably made from an aliphatic polyamide selected from polyamide-n and polyamide-n,m polymers, where n and m are independently selected from 10, 11 or 12. Thus, the polyamide is preferably selected from polyamide-10, polyamide-10,10, polyamide-11, polyamide-11,11, polyamide-12, polyamide-12,12, and polyamide-10-12, and more preferably from polyamide-11, polyamide-12, polyamide-10,10 and polyamide-10,12. In a preferred embodiment, the polyamide is selected from polyamide-10,10 and polyamide-12, and particularly from polyamide-12. In one embodiment, only one type of polyamide from the afore-mentioned list is present in the thermoplastic polyamide particle component. Preferably, the aforementioned thermoplastic polyamide material is the only thermoplastic polyamide present in the thermoplastic polyamide particle component.

The aliphatic polyamides used in the present invention exhibit improved moisture sensitivity, for instance relative to higher melting point polyamide-6, polyamide-6,6, polyamide-6,10 and polyamide-6,12. However, the polyamides used in the present invention tend to have a lower effective melting temperature than polyamide-6, polyamide-6,6, polyamide-6,10 and polyamide-6,12, and such lower effective melting temperatures overlap the range of cure temperatures typically used for epoxy resins, which can result in coalescence of polyamide within the epoxy resin matrix during the cure cycle and the formation of a continuous or semi-continuous polyamide network within the resin matrix. As noted above, the inventors have observed that such morphology results in micro-cracking and is detrimental to hot-wet compressive performance. However, the present inventors have found that the advantageous properties of these polyamides can be utilised by facilitating gelation of the epoxy matrix before any melting of the polyamide during a cure cycle, thereby retaining the particulate morphology. The inventors believe that once the resin matrix has reached the gel-point during the cure cycle, the rigid structure of the resin matrix substantially constrains expansion of the polyamide particles upon melting at temperatures higher than the gel-point subsequently experienced during the cure cycle. Hence, during the cooling phase of the cure cycle, the cooling of molten polyamide does not result in shrinkage of the discrete polyamide phases which would otherwise result in micro-cracks or cavities being generated at the polyamide/epoxy interfaces.

Furthermore, the polyamides used in the present invention result in composite materials with superior compressive performance, damage tolerance and impact resistance (CSAI), for instance relative to polyamide-6 (which is characterized by a much higher melting point).

The molecular weight of the polyamide is typically in the range of from about 2,000 to about 60,000 g/mol, suitably in the range of from about 5,000 to about 50,000 g/mol.

The melting temperature ($T_{PA}$) of the polyamide particles is preferably at least about 160° C., preferably at least about 165° C., and preferably no more than about 200° C. In a preferred embodiment, the melting temperature ($T_{PA}$) of the polyamide particles is not less than 30° C. below the nominal curing temperature, preferably not less than 20° C. below the nominal curing temperature, preferably not less than 10° C. below the nominal curing temperature. Preferably, the melting temperature ($T_{PA}$) of the polyamide particles is not more than 20° C. above the nominal curing temperature, and in one embodiment is no more than the nominal curing temperature. Preferably, all thermoplastic particles in the resin system have a melting temperature ($T_{PA}$) which is no greater than 20° C. above the nominal curing temperature, and in one embodiment no greater than the nominal curing temperature.

As used herein, the term "melting temperature ($T_{PA}$) of the polyamide" refers to the effective melting temperature which is defined herein as the position in degrees Celsius of the endothermic melting peak present in the DSC thermogram (acquired at 10° C./min under nitrogen) of a 25 wt % blend of the polyamide in meta-substituted tri-glycidyl amino phenol (m-TGAP; available as Araldite® MY0610 from Huntsman). This measurement of $T_{PA}$ is illustrated in FIG. 1. The skilled person will therefore appreciate that the effective melting temperature is distinct from the intrinsic melting temperature $T_m$ of the polyamide which is defined as the position in degrees Celsius of the endothermic melting peak present in the DSC thermogram of the polyamide on its own. The effective melting temperature is typically 5 to 15° C. below the intrinsic melting temperature $T_m$, as illustrated in Table (A) below.

TABLE (A)

| Tradename | Chemistry | Intrinsic Tm [° C.] | Effective Tm [° C.] | Δ Tm [° C.] |
|---|---|---|---|---|
| Orgasol1002D NAT | PA-6 | 214 | 204 | 11 |
| Vestosint Z2650 | PA-10,10 | 201 | 191 | 10 |
| Rilsan D30 NAT | PA-11 | 188 | 177 | 11 |
| Orgasol2002D NAT | PA-12 | 176 | 168 | 8 |
| Vestosint2157 | PA-12 | 185 | 176 | 9 |

It will be appreciated by the person skilled in the art that the term "nominal curing temperature" refers to the programmed curing temperature of the cure cycle. The curing temperature $T_C$ as used herein refers to the nominal curing temperature.

As noted above, gelation of the epoxy matrix during the cure cycle occurs at a gelation temperature $T_{GEL}$ which is at or below $T_{PA}$, and is preferably below $T_{PA}$. Preferably, $T_{GEL}$ is at least 5° C., preferably at least 10° C., less than $T_{P4}$. Preferably $T_{gel}$ is not greater than 200° C. when measured with a reference 2° C./min ramp.

The aliphatic polyamides particles used in the resin system of the present invention are preferably crystalline or semi-crystalline, i.e. non-amorphous. A semi-crystalline or crystalline polymer is defined herein as one exhibiting a degree of crystallinity of at least 5%, preferably at least 10%, as measured using differential scanning calorimetry (DSC).

The aforementioned polyamide particles may be pure, i.e. the particles may consist or consist essentially of said polyamide material. Alternatively, the aforementioned polyamide particles may be formulated, i.e. the particles comprise polyamide material and further comprise additives, such as fillers or other functional additives.

The thermoplastic polyamide particles may be manufactured by any conventional method known in the art, for instance, by anionic polymerisation, by coextrusion, precipitation polymerisation, emulsion polymerisation or by cryogenic grinding. Thermoplastic polyamide particles are also commercially available, for instance as Vestosint™ (Evonik), Rilsan™ (Arkema) or Orgasol™ (Arkema).

The Thermoset Resin Precursor

The resin system of the present invention comprises one or more multi-functional epoxy resin precursor(s) having a functionality of three or more, preferably selected from an epoxy resin precursor having three epoxide groups per molecule and/or an epoxy resin precursor having four epoxide groups per molecule. In one embodiment, said epoxy resin precursor(s) are selected from multi-functional epoxides having three, four or more epoxide groups per molecule. The epoxy resin precursor is suitably liquid at ambient temperature. The epoxy resin precursor may be saturated, unsaturated, cycloaliphatic or heterocyclic. In one embodiment, the precursor comprises a meta-substituted phenyl ring in its backbone.

Suitable multi-functional epoxy resins include: phenol and cresol epoxy novolacs; glycidyl ethers of phenolaldehyde adducts; aromatic epoxy resins; dialiphatic triglycidyl ethers; aliphatic polyglycidyl ethers; epoxidised olefins; brominated resins; aromatic glycidyl amines and glycidyl ethers; heterocyclic glycidyl imidines and amides; glycidyl ethers; fluorinated epoxy resins; and combinations thereof.

Preferred epoxy resin precursors include glycidyl derivatives of one or more of the group of compounds consisting of aromatic diamines, aromatic monoprimary amines, aminophenols, polyhydric phenols, polyhydric alcohols, polycarboxylic acids and the like, or mixtures thereof.

Preferred Epoxy Resin Precursors are Selected from:
(i) glycidyl ethers of bisphenol A, bisphenol F, dihydroxydiphenyl sulphone, dihydroxybenzophenone, and dihydroxy diphenyl;
(ii) epoxy resins based on novolacs; and
(iii) glycidyl functional reaction products of m- or p-aminophenol, m- or p-phenylene diamine, 2,4-, 2,6- or 3,4-toluylene diamine, 3,3'- or 4,4'-diaminodiphenyl methane, wherein the epoxy resin precursor has three or four, and in one embodiment at least three, epoxide groups per molecule.

Particularly preferred epoxy resin precursors are selected from O,N,N-triglycidyl-para-aminophenol (TGPAP); O,N,N-triglycidyl-meta-aminophenol (TGMAP); and N,N,N',N'-tetraglycidyldiaminodiphenyl methane (TGDDM).

The ratio of the active hydrogen equivalent in the curing agent to epoxy equivalent, referred to as the stoichiometry, is preferably in the range from 0.5 to 1.5. More preferably, the stoichiometry is the range from 0.75 to 1.25.

Commercially available epoxy resin precursors suitable for use in the present invention include N,N,N',N'-tetraglycidyl diamino diphenylmethane (e.g. grades MY 9663, MY 720 or MY 721; Ciba-Geigy); N,N,N',N'-tetraglycidyl-bis (4-aminophenyl)-1,4-diiso-propylbenzene (e.g. EPON 1071; Shell Chemical Co.); N, N, N',N'-tetraclycidyl-bis(4-amino-3,5-dimethylphenyl)-1,4-diisopropylbenzene, (e.g. EPON 1072; Shell Chemical Co.); triglycidyl ethers of p-aminophenol (e.g. MY 0510; Ciba-Geigy); triglycidyl ethers of m-aminophenol (e.g. MY 0610; Ciba-Geigy); glycidyl ethers of phenol Novolac resins (e.g. DEN 438 or DEN 439; Dow); di-cyclopentadiene-based phenolic Novolac (e.g. Tactix 556, Huntsman).

The present invention may utilise a blend of epoxy resin precursors of a given functionality, i.e. one or more epoxy resin precursors having three epoxide groups per molecule (hereinafter referred to as precursor(s) P3), and/or one or more epoxy resin precursors having four epoxide groups per molecule (hereinafter referred to as precursor(s) P4) and/or one or more epoxy resin precursors having more than four epoxide groups per molecule (hereinafter referred to as precursor(s) PP).

In one embodiment, only P3 precursor(s) are present. In an alternative embodiment, only P4 precursor(s) are present. In a further embodiment, P3 precursor(s) and P4 precursor(s) are both present, and in one embodiment, the resin precursor component comprises:
(i) from about 5 phr to about 95 phr of epoxy resin precursor(s) (P3); and
(ii) from about 5 phr to about 95 phr of epoxy resin precursor(s) (P4),
wherein the phr amounts are the parts in grams of said resin precursor per hundred grams of the total resin precursor component (i.e. excluding curing agent(s), toughening agent(s) and other additive(s)).

In one embodiment, the resin system does not contain epoxy resin precursors with a functionality of less than three, i.e. it does not contain di-functional or mono-functional epoxy resin precursor components (two or one functional epoxide groups, respectively), in order to maximise the hot-wet performance of the cured resin. If mono-functional and/or di-functional epoxy resin precursors are present, then the total amount of such precursor components is preferably less than 10 wt %, preferably no more than 7.5 wt %, preferably no more than 5 wt %, preferably no more than 2.5 wt %, %, preferably no more than 1 wt %, preferably no more than 0.5 wt %, %, preferably no more than 0.1 wt %, relative to the total weight of the resin system (i.e. the combined weight of the thermosetting resin precursor component, the thermoplastic particle component, the curing agent(s) and optional toughening agent component or other additive; in other words, the term "resin system" is used herein to refer to a composition which excludes reinforcing agent(s)). Preferably, the thermosetting resin precursor component comprises no more than 1 wt %, preferably no more than 0.5 wt %, preferably no more than 0.1 wt % of said epoxy resin precursors with a functionality of less than three, relative to the total weight of the thermosetting resin precursor component.

Preferably, the amount of thermosetting resin component in the resin system is in the range of from about 20 to about 80 wt %, more preferably in the range of from about 30 to about 70 wt %, relative to the total weight of the resin system (i.e. the total weight of the thermosetting resin precursor(s), the ILT thermoplastic polyamide particles, the curing agent(s) and any optional additional toughening agent(s) or other additive).

The Curing Agent.

The resin system of the present invention may be cured by any conventional means, for instance autoclave or infra-red or microwave radiation, and should be thermally curable. The addition of one or more curing agent(s) increases the cure rate and/or reduces the cure temperatures. In one embodiment, one or more catalyst(s) may also be used.

Curing agents are well-known in the art, and are disclosed in, for example, EP-A-0311349, EP-A-0486197, EP-A-0365168 or in U.S. Pat. No. 6,013,730, which are incorporated herein by reference. Known curing agents include an amino compound having a molecular weight up to 500 per amino group, for example an aromatic amine or a guanidine derivative. An aromatic amine curing agent is of particular utility for epoxy resin systems, particularly aromatic amines having at least two amino groups per molecule, and particularly diaminodiphenyl sulphones, for instance where the amino groups are in the meta- or in the para-positions with respect to the sulphone group. Particular examples are 3,3'- and 4-,4'-diaminodiphenylsulphone (DDS); methylenedianiline; bis(4-amino-3,5-dimethylphenyl)-1,4-diisopropylbenzene (available as EPON 1062 from Shell Chemical Co.); bis(4-aminophenyl)-1,4-diisopropylbenzene (available as EPON 1061 from Shell Chemical Co.); 4,4'methylenebis-(2,6-diethyl)-aniline (MDEA; Lonza); 4,4'methylenebis-(3-chloro, 2,6-diethyl)-aniline (MCDEA; Lonza); 4,4'methylenebis-(2,6-diisopropyl)-aniline (M-DIPA; Lonza); 3,5-diethyl toluene-2,4/2,6-diamine (D-ETDA 80; Lonza); 4,4'methylenebis-(2-isopropyl-6-methyl)-aniline (M-MIPA; Lonza); 4-chlorophenyl-N,N-dimethyl-urea (e.g. Monuron); 3,4-dichlorophenyl-N,N-dimethyl-urea (e.g. Diuron™) and dicyanodiamide (Amicure™ CG 1200; Pacific Anchor Chemical). Bisphenol chain extenders, such as bisphenol-S or thiodiphenol, are also useful as curing agents for epoxy resins. A further class of known curing agents for epoxy resins are the hydrazides, as disclosed in, for instance, US-2010/0222461-A1, the disclosure of which is incorporated herein by reference. Thus, a hydrazide curing agent may be selected from from the group consisting of hydrazides, dihydrazides, trihydrazides and tetrahydrazides. The dihydrazides, for instance, are represented by the active group [$H_2NHNC(=O)—R—C(=O)NHNH_2$] wherein R is any polyvalent organic radical, for instance carbodihydrazide ($R=CH_2$), and preferably derived from a carboxylic acid, and exemplified by adipic acid dihydrazide (ADH), sebacic acid dihydrazide (SDH), valine dihydrazide (VDH), isophthalic acid dihydrazide (IDH), phthalic dihydrazide, terephthalic dihydrazide and naphthalene dicarboxylic acid dihydrazide. Other hydrazides curing agents include 1,2,3-benzenetricarboxic trihydrazide, trimellitic trihydrazide, trimesic trihydrazide, aromatic monohydrazides, aliphatic monohydrazides, aliphatic monohydrazides, aliphatic dihydrazides, aliphatic trihydrazides, aliphatic tetrahydrazides, aromatic monohydrazides, aromatic dihydrazides, aromatic trihydrazides, aromatic tetrahydrazides and naphthanoic acid hydrazide.

In the present invention, a single curing agent may be used, or a combination of curing agents may be used. Where a combination of curing agents is used, the curing agents may be referred to as a primary curing agent and one or more secondary curing agent(s). Where a combination of curing agents is used, the curing agents preferably have different relative reactivity, and the curing agent with the relatively higher reactivity is referred to herein as the primary curing agent, and the curing agent(s) with relatively lower reactivity are referred to herein as the secondary curing agent(s).

Where a primary curing agent is used in combination with one or more secondary curing agent(s), the relative ratios are such that the primary curing agent is typically present in a stoichiometry of at least about 50%, preferably at least about 60%, preferably at least about 70% and preferably at least about 80% of the total amount of curing agent present in the resin system. However, the resin systems of the present invention also encompass the use of a highly reactive primary curing agent which is used in a relatively minor proportion, relative to said one or more secondary curing agent(s) of lower reactivity, such that said highly reactive primary curing agent is present in a stoichiometry of less than 50%, preferably no more than 40%, preferably no more than 30%, preferably no more than 20%, preferably no more than 10% of the total amount of curing agent present in the resin system.

In a first preferred embodiment, a single curing agent is used. In this embodiment, the curing agent is preferably selected from 3,3'-DDS and 4,4'-DDS, and in one embodiment from 3,3'-DDS.

In a second preferred embodiment, a combination of curing agents is used wherein the primary curing agent is preferably selected from 3,3'-diaminodiphenyl sulphone (DDS) and isophthalic acid dihydrazide (IDH). In this embodiment, the secondary curing agent is preferably selected from 4,4'-DDS, particularly wherein the primary curing agent is IDH.

Thus, in one preferred embodiment, a combination of IDH and 4,4'-DDS is used as curing agents in the resin systems of the present invention, wherein IDH is the primary curing agent and 4,4'-DDS is the secondary curing agent. In this case, however, the IDH primary curing agent is of such high reactivity that it is used in the relatively minor proportions noted above, relative to the 4,4'-DDS secondary curing agent, and particularly wherein the IDH is present in a stoichiometry of no more than 10% of the total amount of curing agent present in the resin system. The inventors have found that such a combination is particularly suitable for providing the kinetics to achieve gelation of the resin matrix prior to melting of the polyamide particles.

In a further embodiment, a combination of 3,3'-DDS and 4,4'-DDS is used as curing agents in the resin systems of the present invention, wherein 3,3'-DDS is the primary curing agent and 4,4'-DDS is the secondary curing agent, preferably in the proportions noted above wherein the primary curing agent is present as a major proportion of the total amount of curing agent present in the resin system.

In a further embodiment, a curing agent selected from hydrazides is used in combination with a curing agent selected from amines, and the relative ratios are such that the hydrazine-based curing agent is present in less than 50% stoichiometry based upon the epoxy resins equivalent weight; and the amine-based curing agent is present in greater than 30% stoichiometry based upon epoxy resins equivalent weight.

The curing agent(s) is typically present at a stoichiometry in the range from 0.5 to 1.5, more preferably in the range from 0.75 to 1.25.

More generally, the curing agent(s) is typically present at about 5-60% by weight, preferably about 20-50% by weight, typically about 25-40% by weight, relative to the total combined weight of the thermoset resin precursor component plus curing agent(s) of the resin system. The total amount of curing agent(s) in the resin system is preferably in the range of from about 5 to about 60 wt %, more preferably in the range of from about 20 to about 50 wt %, typically about 25-40% by weight, relative to the total weight of the resin system (i.e. the total weight of the thermosetting resin precursor component, the thermoplastic polyamide particle component, the curing agent(s) and any optional additional toughening agent(s) or other additive).

Where a catalyst is used, for instance to accelerate the curing reaction, suitable catalysts are well known in the art and include Lewis acids or bases. Specific examples include compositions comprising boron trifluoride, such as the etherates or amine adducts thereof (for instance the adduct of boron trifluoride and ethylamine), particularly where epoxy resin precursors are used in conjunction with the aforementioned amine curing agents.

According to the present invention, the components of the resin system are selected such that gelation of the epoxy matrix during the cure cycle of the resin system occurs at a gelation temperature $T_{GEL}$ which is at or below $T_{P4}$. In this regard, particularly preferred combinations are:

(i) a resin precursor component comprising tri- and/or tetrafunctional epoxy resin precursor(s), polyamide-12 particles and 3,3'-DDS;
(ii) a resin precursor component comprising tri- and/or tetrafunctional epoxy resin precursor(s), polyamide-11 particles and 3,3'-DDS;
(iii) a resin precursor component comprising tri- and/or tetrafunctional epoxy resin precursor(s), polyamide-10, 10 particles and 4,4'-DDS; and
(iv) a resin precursor component comprising tri- and/or tetrafunctional epoxy resin precursor(s), polyamide-12 particles, 4,4'-DDS and IDH.

Uses of the Curable Polymer Compositions and Cured Thermoset Resin Compositions

The resin systems described herein define compositions which can be used to manufacture cast or moulded structural materials, in pre-pregs. These compositions are particularly suitable for fabrication of structures, including load-bearing or impact-resisting structures. The compositions may be used neat, or as composite materials reinforced with fibres or fillers.

Thus, according to a further aspect of the invention there is provided a moulded or cast article comprising, or derived from, the resin systems defined herein.

According to a further aspect of the invention there is provided a composite material comprising, or derived from, the resin systems described hereinabove, particularly wherein the composite material is, or comprises, a pre-preg.

Moulded products are obtainable from the compositions comprising the resin systems defined herein by the general steps of mixing the uncured resin precursor component with the (optional but preferred) additional toughening agent(s) (preferably thermoplastic toughening agent(s) discussed hereinbelow, and homogenising the mixture thus obtained, which is then cooled. The thermoplastic polyamide particle component and the curing agent(s) (and optionally a catalyst if required) are then added, the mixture is cast into a mould to obtain a moulded product, and the moulded product is cured at an elevated temperature as described herein to form a cured moulded product.

In a preferred embodiment, particularly for the fabrication of load-bearing or impact-resisting structures, the compositions are composite materials comprising the resin systems defined herein and further comprising reinforcing agent(s) such as fibres or fillers.

Fibres can be added short or chopped typically of mean fibre length not more than 2 cm, for example about 6 mm. Alternatively, and preferably, the fibres are continuous and may, for example, be uni-directionally disposed fibres or woven fabric or braided, knitted or non-woven fabrics to form a pre-preg. As used herein, the term "pre-preg" refers to pre-impregnated and non-cured fibre-reinforced composite materials. A pre-preg typically comprises continuous fibres, but combinations of both short and/or chopped fibres and continuous fibres may be utilised. For some applications, the pre-preg fibres can be selected from short and/or chopped uni-directional fibres alone.

Fibres may be sized or unsized. Fibres can be added typically at a concentration of least 20%, especially from 30% to 70%, more especially 50 to 70% by volume, relative to the total volume of the composition comprising the resin system defined herein and reinforcing agent(s). For structural applications, it is preferred to use continuous fibre, for example glass or carbon.

The fibre can be organic, especially of stiff polymers such as poly paraphenylene terephthalamide, or inorganic. Among inorganic fibres, glass fibres such as "E" or "S" can be used, or alumina, zirconia, silicon carbide, other compound ceramics or metals. A very suitable reinforcing fibre is carbon, especially as graphite. Graphite fibres which have been found to be especially useful in the invention are the intermediate modulus (IM) carbon fibres.

Organic or carbon fibre is preferably unsized or is sized with a material that is compatible with the resin systems defined herein, in the sense of being soluble in the liquid precursor composition without adverse reaction or of bonding both to the fibre and to the thermoset/thermoplastic components described herein. In particular, carbon or graphite fibres that are unsized or are sized with resin precursor are preferred. Inorganic fibre preferably is sized with a material that bonds both to the fibre and to the polymer composition; examples are the organo-silane coupling agents applied to glass fibre.

In a preferred embodiment, the resin systems of the present invention further contain conventional toughening agents such as high-Tg engineering thermoplastic toughening agents, such as thermoplastic aromatic polymers having relatively high Tg (for instance at least about 150° C.) and having a divalent (or higher valency) aromatic radical repeating unit which lies within, rather than pendant to, the polymer backbone. Such aromatic polymers are preferably selected from the group consisting of polyethers, polyether sulphones, polyether imides, polyimides, polyether ketones, polycarbonates, polysulphones, polyketones, mixed polysulphone-ketones, mixed polyether sulphone-ketones, polyesters, polyetheresters, polyamides, polyetheramides, and polysulphides, and copolymers thereof, more preferably selected from the group consisting of aromatic polyether sulphones, aromatic polyether ketones, aromatic polyether imides, and aromatic polysulphide-sulphones, and most preferably selected from the group consisting of polyethersulphones, for instance as defined in US-2004/0044141, U.S. Pat. No. 6,437,080 and the applicant's co-pending International patent application number PCT/GB2012/051779, the disclosure of which aromatic polymers is incorporated herein by reference. Preferred polyether sulphones include poly-1,4-phenylene-oxy-1,4-phenylene-sulphone; the polyether sulphone made from bisphenol A and dichlorodiphenyl sulphone; and poly-bis(1,4-phenylene)-oxy-1,4-phenylene-sulphone. Alternatively, or additionally, the resin systems may contain toughening agents which are block copolymers, for instance those disclosed in WO-2006/077153-A or, more preferably, the block copolymers disclosed in the applicant's co-pending International patent application number PCT/GB2012/051779, the disclosure of which block copolymers is incorporated herein by reference.

A particularly preferred group of thermoplastic aromatic polymers for use as toughening agents in the resin systems of the present invention are the aromatic polyether sulphones selected from polyarylsulphone(s) comprising ether-linked repeating units, optionally further comprising thio-ether-linked repeating units, the units being selected from:

—[ArSO$_2$Ar]$_n$— and optionally from:

—[Ar]$_a$— wherein:
Ar is phenylene;
n=1 to 2 and can be fractional;
a=1 to 3 and can be fractional and when a exceeds 1, said phenylene groups are linked linearly through a single chemical bond or a divalent group other than —SO$_2$— (preferably wherein the divalent group is a group —C(R$^1$)$_2$— wherein each R$^1$ may be the same or different and selected from H and C$_{1-8}$ alkyl (particularly methyl)), or are fused together,
provided that the repeating unit —[ArSO$_2$Ar]$_n$— is always present in the polyarylsulphone in such a proportion that on average at least two of said —[ArSO$_2$Ar]$_n$— units are in sequence in each polymer chain present,
and wherein the polyarylsulphone has one or more reactive pendant and/or end group(s), as disclosed in greater detail the afore-mentioned prior art, and the disclosure of that is incorporated herein by reference.

Preferably the polyarylsulphone comprises a combination of —[ArSO$_2$Ar]$_n$— and —[Ar]$_a$— repeating units, linked by ether and/or thio-ether linkages, preferably by ether linkages. Thus, preferably the polyarylsulphone comprises a combination of polyethersulphone (PES) and polyetherethersulphone (PEES) ether-linked repeating units. Preferably, the preferred repeating units in said polyarylsulphones are:

—X—Ar—SO$_2$—Ar—X—Ar—SO$_2$—Ar— (referred to herein as a "PES unit")     (I):

and

—X—(Ar)$_a$—X—Ar—SO$_2$—Ar— (referred to herein as a "PEES unit")     (II):

wherein:
X is O or S (preferably O) and may differ from unit to unit; and
the ratio of units I:II is preferably in the range of from 10:90 to 80:20, as disclosed in the afore-mentioned prior art.

Alternatively, or additionally, the resin systems may comprise other additives including known pre-formed particulate toughening agents such as glass beads, rubber particles and rubber-coated glass beads, filler such as polytetrafluoroethylene, silica, carbon nanotubes, graphite, boron nitride, mica, talc and vermiculite, pigments, nucleating agents, and stabilisers such as phosphates. Liquid rubbers having reactive groups may also be used. Preferably, though, the toughening agents present in the composition are selected from the group consisting of the block copolymers and high-Tg engineering thermoplastics referred to hereinabove.

The total amount of toughening agent(s) and any fibrous reinforcing agent in the resin systems of the present invention is typically at least 20% by volume, as a percentage of the total volume of the composition comprising the resin system defined herein and reinforcing agent(s). The percentages of fibres and such other materials are calculated on the total composition after curing at the temperatures described hereinbelow.

Toughening agents, particularly the thermoplastic aromatic polymers having relatively high Tg noted above, are preferably present in the resin system defined herein in an amount of from about 5 to about 40 wt %, preferably in an amount of about 7.5 to about 32.5 wt %, by weight of the resin system (i.e. the total weight of the thermosetting resin precursor component, the thermoplastic polyamide particle component, the curing agent(s) and the toughening agent(s) and other optional additive).

The composites are obtained from a curable polymer composition made by combining the resin precursor component and the thermoplastic polyamide particle component with fibrous reinforcing agent and/or other materials. For instance, the manufacture of a pre-preg typically comprises the steps of mixing the resin precursor component and the thermoplastic particle, adding one or more curing agent(s) (and optional catalyst as required), homogenising the mixture thus obtained, and applying the homogenised mixture to a bundle or strand of parallel aligned fibres or fibre weaves or braided or knitted or non-woven fabrics to form the pre-preg. A solvent may be present to aid processing, as is known in the art.

More specifically, fabrication of articles and composites from the resin systems of the present invention is as follows. Curing is suitably carried out at elevated temperature using a cure temperature (T$_C$) of up to 200° C., preferably at least 140° C., preferably at least 160° C., preferably in the range from 160 to 195° C., more preferably from 170 to 190° C., and more preferably from 175 to 185° C. Curing can be performed in an autoclave at elevated pressure to restrain deforming effects of escaping gases, or to restrain void formation, suitably at pressure of up to 10 bar, preferably in the range of 3 to 7 bar abs. Alternatively, curing can be performed out-of-the-autoclave under vacuum only. The cure temperature (T$_a$) is attained by heating at a cure ramp rate (R$_{CR}$) which is preferably at least about 0.05° C./min, preferably at least about 0.1° C./min, preferably at least about 0.5° C./min, and typically up to about 3.0° C./min, more typically up to about 2.5° C./min, and in one embodiment up to about 2.0° C./min, and in one embodiment in the range of from about 0.1° C./min to about 2.5° C./min, typically from about 0.5° C. to about 2.0° C./min. The cure temperature is maintained for the required period of up to 6 hours, preferably up to 2 hours.

According to a further aspect of the invention, there is provided a composite comprising pre-pregs laminated together by heat and pressure, for example by autoclave, compression moulding, or by heated rollers, at a temperature above the curing temperature of the curable polymer composition comprising the resin system defined herein.

The resin systems of the present invention find particular utility in the manufacture of components suitable for use in transport applications (including aerospace, aeronautical, nautical and land vehicles, and including the automotive, rail and coach industries), in building/construction applications or in other commercial applications. In the aerospace and aeronautical industry, the resins systems may be used for primary and secondary parts of the aircraft, and particularly for primary parts (for example wing, fuselage, pressure bulkhead etc.).

According to a further aspect of the present invention, there is provided the use of a combination of the thermoset resin precursor component as defined herein and the curing agent(s) defined herein, in a resin system comprising ILT thermoplastic polyamide particles for the purpose of retaining the morphology of said particles and/or reducing or eliminating micro-cracking and/or improving compressive performance (OHC strength and particularly hot-wet OHC strength) in a cured resin produced from said resin system. In a further aspect, said retaining the morphology of said particles and/or reducing or eliminating micro-cracking and/or improving compressive performance (OHC strength and particularly hot-wet OHC strength) is achieved without significant detriment to CSAI and/or $G_{IIC}$ (preferably CSAI and $G_{IIC}$).

According to a further aspect of the present invention, there is provided a method for retaining the morphology of ILT thermoplastic polyamide particles and/or reducing or eliminating micro-cracking and/or improving compressive performance (OHC strength, particularly hot-wet OHC strength) in a cured resin produced from a resin system comprising said particles, said method comprising (i) selecting a thermoset resin precursor component comprising one or more multi-functional epoxy resin precursor(s) as defined herein, (ii) combining said thermoset resin precursor component with the ILT thermoplastic polyamide particle component as defined herein, (iii) curing the combination of said thermoset resin precursor component and said thermoplastic polyamide particle component with the curing agent(s) as defined herein. In a further aspect, said retaining the morphology of said particles and/or reducing or eliminating micro-cracking and/or improving compressive performance (OHC strength and particularly hot-wet OHC strength) is achieved without significant detriment to CSAI and/or $G_{IIC}$ (preferably CSAI and $G_{IIC}$).

The use and method described hereinabove are of particular utility for retaining the morphology of said particles and/or reducing or eliminating micro-cracking and/or improving compressive performance (OHC strength, particularly hot-wet OHC strength) in a resin system which is suitable to be cured at any temperature ramp rate in the range up to 3.0° C./min (and particularly the cure ramp rates described herein above).

As used herein, the term "without significant detriment to CSAI and/or $G_{IIC}$" means that the cured resin maintains CSAI and/or $G_{IIC}$ properties suitable for use as primary and secondary parts (and particularly for primary parts) in the aerospace and aeronautical industry.

Preferably, the composite materials of the present invention exhibit a value of inter-laminar fracture toughness in mode II ($G_{IIC}$) which is at least 10 in-lb/in² across the broad and preferred cure ramp rates $R_{CR}$ noted hereinabove, and particularly at cure ramp rates $R_{CR}$ in the range of from 0.05 to 2.5° C./min, particularly wherein $R_{CR}$ is at least about 0.1° C./min, particularly at least about 0.5° C./min.

According to a further aspect of the present invention, there is provided a process for producing a cured thermoset resin comprising the steps of:
(i) selecting a thermosetting resin precursor component comprising one or more multi-functional epoxy resin precursor(s) having a functionality of at least three, preferably wherein said precursor(s) are selected from a tri-functional epoxy resin precursor and/or a tetra-functional epoxy resin precursor,
(ii) combining said resin precursor component with a thermoplastic polyamide particle component wherein the polyamide particles have a melting temperature $T_{PA}$, and
(iii) curing the combination of said resin precursor component and said thermoplastic particle component with one or more curing agent(s), wherein said resin precursor component, said polyamide particle component and said curing agent(s) are selected such that gelation of the epoxy matrix during the cure cycle occurs at a gelation temperature $T_{GEL}$ which is below $T_{PA}$, particularly wherein gelation of the epoxy matrix during the cure cycle occurs at a gelation temperature $T_{GEL}$ which is below $T_{PA}$ for cure ramp rates $R_{CR}$ in the range of 0.05° C./min to 3.0° C./min (and particularly the cure ramp rates described herein above).

The invention is now illustrated in non-limiting manner with reference to the following examples.

EXAMPLES

The physical properties and behaviour of the resin systems described herein may be measured according to the following techniques.

Glass Transition Temperature

The glass transition temperature is defined as the temperature where the sample exhibits a dramatic change in mechanical and damping behaviour with increasing temperature when subjected to an oscillating displacement. The Tg onset is defined as the temperature intersection of extrapolated tangents drawn from points on the storage modulus curve before and after the onset of the glass transition event. The test was performed using TA Q800 in a single cantilever bending mode in the range of temperatures between about 50° C. and 300° C., with a heating rate of 5±0.2° C./min and 1 Hz frequency.

Particle Size

Particle size distribution was measured by laser diffraction using a Malvern Mastersizer 2000 operating in the 0.02 μm to 2000 μm range.

Mechanical Properties

Inter-laminar fracture toughness in mode I ($G_{IC}$) was measured on uni-directional (UD) layups on double-cantilevered beam (DCB) coupons according to the BSS7273 test method.

Inter-laminar fracture toughness in mode II ($G_{IIC}$) was measured on uni-directional (UD) layups on end-notched coupons loaded in 3-point flexural mode (ENF) according to the BMS8-276 test method.

Compression strength after impact (CSAI; in kilo-pounds per square inches (ksi)) was measured according to the BSS7260 test method. The coupon to be tested is subjected to an impact of defined energy prior to loading in compression. The coupon is then loaded in compression in an anti-buckling jig and the strength of the coupon is measured.

Open hole compression (OHC; in kilo-pounds per square inches (ksi)) was measured according to the ASTM D6484 test method. Hot-wet performance was assessed by measuring OHC strength at 160° F. (approx. 71.1° C.) after soaking the coupons for 14 days in water at 160° F. (approx. 71.1° C.).

Open hole tensile (OHT; in kilo-pounds per square inches (ksi)) was measured according to ASTM D5766.

Morphology

Typically, a coupon is cut perpendicularly to its zero direction and then polished to obtain a cross-section revealing the inter-laminar region. The coupon is then observed using optical microscopy (OM). Since the polyamide particles are greater than 5 μm and are characterized by a refractive index sufficiently different from the surrounding thermosetting matrix, OM can be used to observe the inter-laminar morphology.

Micro-Cracking

The presence and extent of micro-cracking may be assessed using optical microscopy (OM) or scanning electron microscopy (SEM) analysis. Typically, a coupon is cut perpendicularly to its zero direction and then polished to obtain a cross-section revealing the inter-laminar region. The coupon is then observed either by SEM or OM. Micro-cracking can be enhanced by subjecting the coupon to a cold-hot thermal cycling.

Rheology and Thermodynamics of the Resin Systems During Cure

Rheometry and DSC were used to assess the rheology and thermodynamics of the resin systems during a cure cycle, in order to measure the gelation temperature of the resin system and the melting point of the polyamide particles therein. The DSC thermograms were acquired on a TA Q2000 DSC under a nitrogen environment. The rheology curves were acquired on an ARES under compressed air, using parallel stainless steel plates, a frequency of 10 rad/sec and a strain of 10% and gap between 0.6 mm and 1.3 mm.

The following resin systems were prepared and analysed according to the test procedures described above.

Example 1

A series of resin systems was formulated using the components shown in Table 1 below to produce a 2.5 kg composition.

TABLE 1

| Component | resin system 1 wt % | resin system 2 wt % | resin system 3 wt % | resin system 4 wt % |
|---|---|---|---|---|
| MY721 | 26.16 | 26.16 | 20.93 | 20.93 |
| MY0610 | 26.16 | 26.16 | 20.93 | 20.93 |
| PES5003P | 18.00 | 18.00 | 14.40 | 14.40 |
| Vestasint 2159 | — | — | 20.00 | 20.00 |
| 4,4'-DDS | 29.68 | — | 23.75 | — |
| 3,3'-DDS | — | 29.68 | — | 23.75 |
| total | 100 | 100 | 100 | 100 |

Key:
MY721 is tetraglycidyldiaminodiphenylmethane TGDDM (Araldite MY721; Huntsman)
MY610 is triglycidyl m-aminophenol (Araldite MY0610; Huntsman)
PES5003P is polyethersulphone (Sumitomo Chemical Co. Ltd) added as soluble toughening agent
Vestasint ® 2159 is polyamide-12 particles (10 µm; Evonik Industries)
4,4'-DDS is 4,4'-diaminodiphenyl sulphone (Huntsman)
3,3'-DDS is 3,3'-diaminodiphenyl sulphone (Huntsman)

For resin systems 1 and 2, the epoxy resin precursors MY721 and MY610 were heated to 75° C. and mixed thoroughly. The PES5003P toughening agent was added at 75° C. and slurried for 20 minutes, and the temperature of the mixture then increased to 125° C. until complete dissolution. The mixture was then cooled to 85° C., and the curing agent (4,4'-DDS or 3,3'-DDS) then added at 85° C., and the mixture slurried for a further 25 minutes at that temperature.

For resin systems 3 and 4, the epoxy resin precursors MY721 and MY610 were heated to 75° C. and mixed thoroughly. Half of the PES5003P toughening agent was added at 75° C. and slurried for 20 minutes, and the temperature of the mixture then increased to 125° C. until complete dissolution. The mixture was then cooled to 85° C., and the second half of the PES5003P toughening agent added at 85° C. and the mixture slurried for 15 minutes at that temperature. The curing agent (4,4'-DDS or 3,3'-DDS) was added at 85° C., and the mixture slurried for a further 15 minutes at that temperature. The Vestasint 2159 particles were added at 85° C. and slurried until full dispersion was achieved.

The compositions so produced were then filmed to an aerial weight of 25.5 gsm on support paper. Intermediate modulus (IM) carbon fibres were spread in a pre-preg machine to an aerial weight of 190 gsm. The resin films were then applied to each side of the spread fibres to obtain a pre-preg with a fibre areal weight (FAVV) of 190 gsm, and a resin content of 35% by weight.

To manufacture laminate 1, the films made out of resin 1 were applied to each side of the spread fibres followed by the application of the films made out of resin 3 to obtain a pre-preg with a fibre areal weight (FAW) of 190 gsm, a resin content of 35% by weight.

To manufacture laminate 2, the films made out of resin 2 were applied to each side of the spread fibres followed by the application of the films made out of resin 4 to obtain a pre-preg with a fibre areal weight (FAW) of 190 gsm, a resin content of 35% by weight.

The laminates were then cured at 180° C. using a cure ramp rate of 2° C./min. The laminates were then tested according to the procedures described herein, and the results shown in Table 2 below.

TABLE 2

| | | Laminate 1 (4,4'-DDS pre-pregs) | | Laminate 2 (3,3'-DDS pre-pregs) | |
|---|---|---|---|---|---|
| Property | | measured | normalised | measured | normalised |
| OHC (ksi) | RT | 67.5 ± 8.0 | 65 | 71.3 ± 2.3 | 71 |
| | 160° F. HW | 54.5 ± 6.1 | 54.4 | 62.1 ± 1.7 | 61.5 |
| OHT (ksi) | RT | 88 | 86 | 83 | 81 |
| CSAI (ksi) | 230 in-lb | Top-end failure | — | 52 | 51 |
| | 270 in-lb | 51 | 50 | 49 | 47 |
| ENF (in-lb/in$^2$) | $G_{IIC}$ 1st crack | 12.6 | — | 11.4 | — |
| | $G_{IIC}$ average | 11.7 | — | 11.1 | — |

The results in Table 2 demonstrate that the 3,3'-DDS cured laminates exhibit increased OHC strength and hot-wet compressive performance, relative to the 4,4'-DDS cured laminates, while maintaining excellent CSAI strength and $G_{IIC}$ performance.

Preferably, the composite materials of the present invention exhibit a value of inter-laminar fracture toughness in mode II ($G_{IIC}$) which is at least 10 in-lb/in$^2$.

Figure 2:
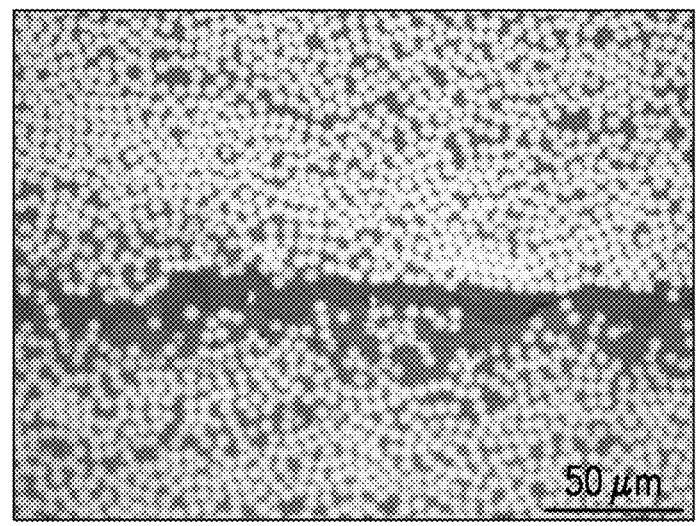
FIGS. 2 and 3 are optical microscopy images showing the cross-sectional views of composite laminates prepared according to an example.
Figure 3:
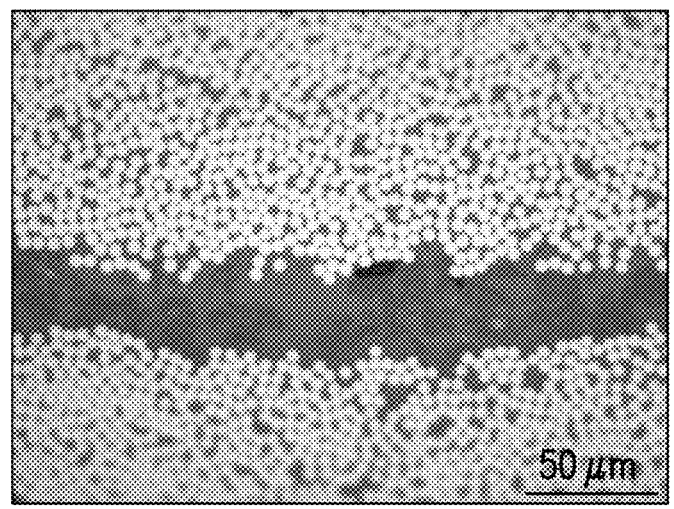

From the panel used to measure the $G_{IIC}$ performance, small samples perpendicular to the direction of the fibre was cut, polished and observed by optical microscopy. The optical microscopy images are shown in FIGS. 2 and 3 for the cross-sectional view of Laminates 1 and 2, respectively, which yield the resin thicknesses set out in Table 3 below.

TABLE 3

| Laminate | Resin thickness (μm) | | | |
| --- | --- | --- | --- | --- |
| | Minimum | Maximum | Average | Std. Dev. |
| Laminate 1 | 0 | 76.77 | 23.23 | 13.33 |
| Laminate 2 | 11.92 | 74.80 | 32.38 | 9.61 |

The greater resin thickness in Laminate 2 demonstrates that the 3,3-DDS-cured resin system according to the invention is more able to create and maintain an inter-laminar gap between the fibre-reinforcing layers. It is apparent from the optical micrograph in FIG. 1 that some coalescence of the molten polyamide particles has occurred in the inter-laminar region of Laminate 1, whereas little or no coalescence has occurred in the inter-laminar region of Laminate 2. The gelation of the epoxy resin matrix in Laminate 2 prior to the melting of the polyamide particles during the cure cycle, resulted in retention of discrete polyamide particles rather than a coalesced polyamide continuous phase or network. As a result, micro-cracking at the particle/matrix interface is reduced, and the hot-wet compressive performance of the cured composite material is improved.

Example 2

Figure 4A:
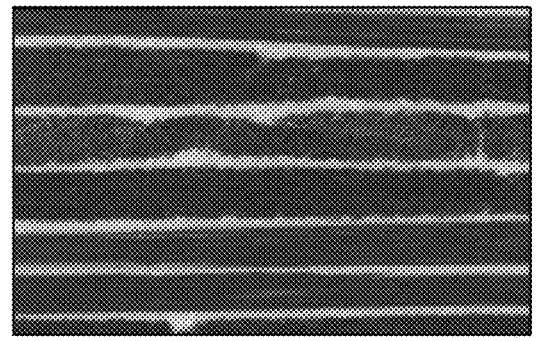
FIGS. 4A, 4B, 5A, 5B, 6A, 6B, 7A, 7B are optical microscopy images showing the cross-sectional views of composite laminates prepared according to another example.
Figure 4B:
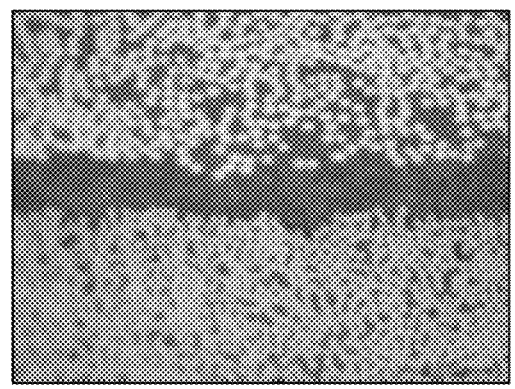
Figure 5A:
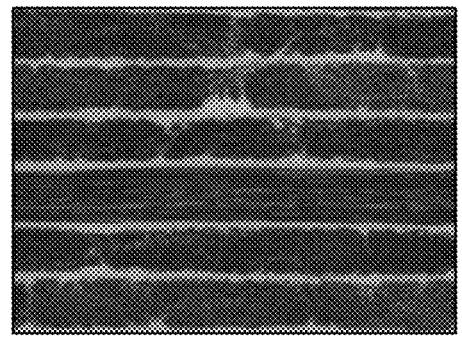
Figure 5B:
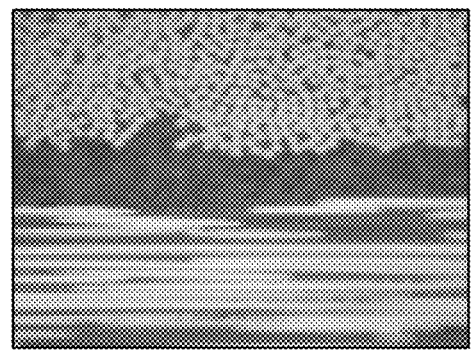
Figure 6A:
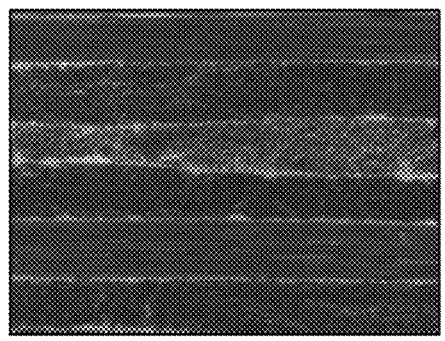
Figure 6B:
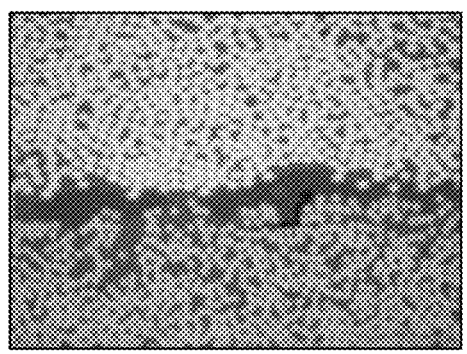
Figure 7A:
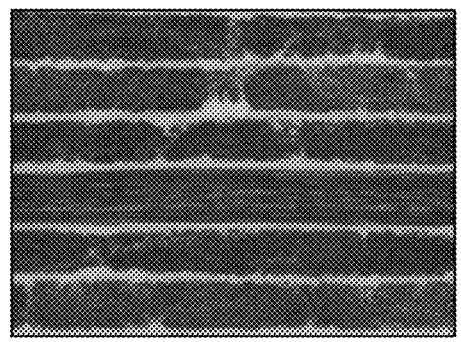
Figure 7B:
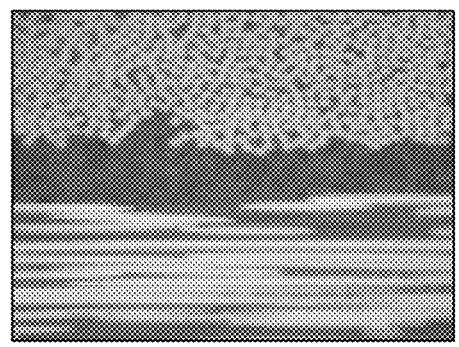

Two further laminates (Laminates 3 and 4) were prepared in a manner similar to Laminate 1 above, but using cure ramp rates of 0.5° C./min and 2.5° C./min, respectively. Additionally, two further laminates (Laminates 5 and 6) were prepared in a manner similar to Laminate 2 above, but using cure ramp rates of 0.5° C./min and 2.5° C./min, respectively. The samples were analysed as described herein. The results of optical microscopy are shown in FIGS. 3 and 4 herein. FIGS. 4A, 4B, 5A, 5B show the optical microscopy images for the cross-sectional view of the laminates cured at 0.5° C./min. Laminate 3 (4,4'-DDS) is shown in FIG. 4A, and an exploded view of an interlaminar region thereof is shown in FIG. 4B. Laminate 5 (3,3'-DDS) is shown in FIG. 5A, and an exploded view of an interlaminar region thereof is shown in FIG. 5B. FIGS. 6A, 6B, 7A, 7B show the optical microscopy images for the cross-sectional views of the laminates cured at 2.5° C./min. Laminate 4 (4,4'-DDS) is shown in FIG. 6A, and an exploded view of an interlaminar region thereof is shown in FIG. 6B. Laminate 6 (3,3'-DDS) is shown in FIG. 7A, and an exploded view of an interlaminar region thereof is shown in FIG. 7B.

The optical microscopy demonstrates that inter-laminar morphology of the ILT polyamide particles in the 4,4'-DDS cured laminate was strongly influenced by the curing rate used during the manufacture of the laminates, as follows:

(i) at the slower heating rate (0.5° C./min), there was no indication of coalescence of the polyamide particles and particulate morphology was retained, but (ii) at the higher heating rate (2.5° C./min), a semi-continuous network of coalesced polyamide within the resin phase was observed, in which the polyamide particles had melted and coalesced during the cure cycle, with loss of particulate morphology of the polyamide particles.

In contrast, the corresponding experiments with the more reactive 3,3'-DDS as the curing agent exhibited particulate morphology without coalescence at both low and high heating rates. The higher reactivity of the 3,3'-DDS allowed the resin matrix surrounding the polyamide particles to gel prior to the melting of the polyamide particles, thus "freezing" the polyamide in its original particulate morphology.

Optical microscopy also revealed that when a particulate morphology was maintained after curing, there was no sign of micro-cracking. However, a coalesced semi-continuous morphology was accompanied by a significant amount of micro-cracking, even prior to any cold/heat thermal cycling.

Example 3

A resin system similar to that described for Experiment 1 was formulated using the components in Table 4 below. In this example, the 4,4'-DDS curing agent is supplemented, rather than replaced, with a curing agent having relatively higher reactivity, in order to promote earlier gelation of the epoxy matrix.

TABLE 4

| Component | resin system 5 wt % |
| --- | --- |
| MY721 | 21.09 |
| MY0610 | 21.09 |
| PES5003P | 14.40 |
| Vestasint 2159 | 20.00 |
| 4,4'-DDS | 21.54 |
| IDH | 1.87 |
| total | 100 |

Key:
IDH is isophthalic dihydrazide

The epoxy resin precursors MY721 and MY610 were heated to 75° C. and mixed thoroughly. The Half of the PES5003P toughening agent was added at 75° C. and slurried for 20 minutes, and the temperature of the mixture then increased to 125° C. until complete dissolution. The mixture was then cooled to 85° C., and the second half of the PES5003P toughening agent added at 85° C. and the mixture slurried for 15 minutes at that temperature. The IDH curing agent was added at 85° C., and the mixture slurried for a further 15 minutes at that temperature. The 4,4'-DDS curing agent was added at 85° C., and the mixture slurried for a further 15 minutes at that temperature. The Vestasint® particles were added at 85° C. and slurried until a fully homogenous mix was achieved.

The compositions of resin systems 3, 4 and 5, i.e. the compositions with 4,4'-DDS, 3,3'DDS and 4,4'DDS/IDH as curing agents, respectively, were then analysed by rheometry and DSC as described above during a cure cycle at a temperature ramp rate of 2.5° C./min to determine the influence of the relative rates of gelation of the epoxy network and the melting of the polyamide particles. The results are summarised in FIG. 8.

Figure 8:
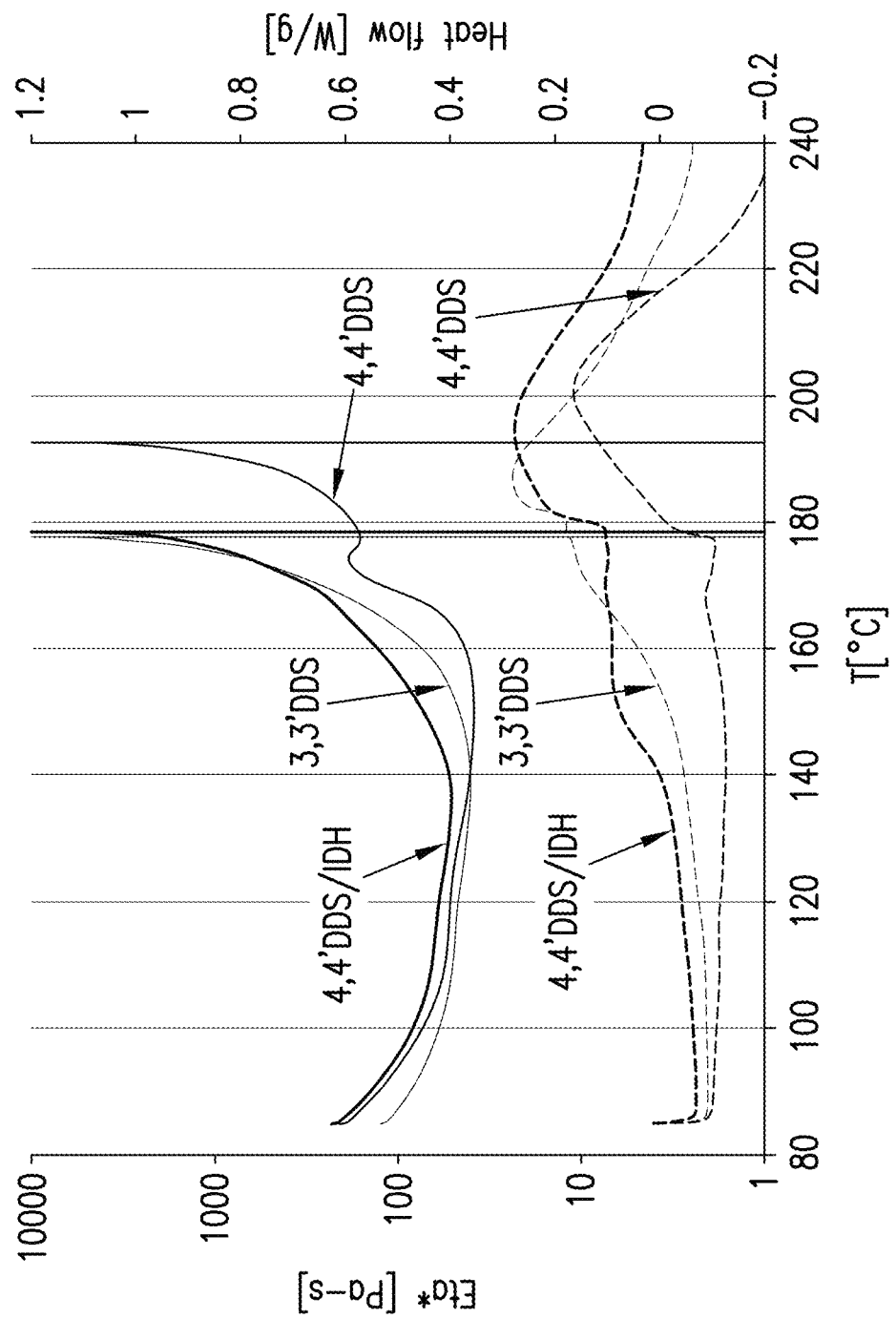
FIG. 8 shows the viscosity profiles (continuous lines) and the DSC thermograms (dash lines) for three resins prepared according to another example

The graphs of viscosity against temperature illustrates the sharp increase in viscosity at the gel-point in each of the resin systems, and also that the temperature of the gel-point differs in the three systems (177, 178 and 192° C.; which at 1000 Pa·s are 175, 175.5 and 190° C., respectively). The graphs of heat-flow against temperature are used to identify the melting points of the polyamide particles in each of the resin systems. FIG. 8 therefore illustrates that the temperature of the gel-point in resin systems 4 and 5 (using 3,3'-DDS and 4,4'-DDS/IDH as curing agents, respectively) is significantly lower than the temperature of the peak of the melting endotherm, whereas the temperature of the gel-point in resin system 3 (using 4,4'-DDS as curing agent) is higher than that of the melting peak.

Example 4

A series of resin systems was formulated using the components shown in Table 5 below to produce a 2.5 kg composition.

TABLE 5

| Component | resin system 6 wt % | resin system 7 wt % | resin system 8 wt % | resin system 9 wt % |
|---|---|---|---|---|
| MY0510 | 26.8 | 19.8 | 19.8 | 19.8 |
| PY306 | 26.8 | 19.8 | 19.8 | 19.8 |
| PES5003P | 19.4 | 14.4 | 14.4 | 14.4 |
| 4,4'-DDS | 27.0 | 20.0 | 20.0 | 20.0 |
| Orgasol1002D | — | 26.00 | — | — |
| Orgasol2002D | — | — | 26.0 | — |
| Vestosint Z2640 | — | — | — | 26.0 |
| total | 100 | 100 | 100 | 100 |

Key:
MY0510 is triglycidyl p-aminophenol p-TGAP (Araldite MY0510; Huntsman)
PY306 is diglycidylether of bisphenol-F DGEBF (Araldite PY306; Huntsman)
PES5003P is polyethersulphone (Sumitomo Chemical Co. Ltd) added as soluble toughening agent
4,4'-DDS is 4,4'-diaminodiphenyl sulphone (Huntsman)
Orgasol ® 1002D is polyamide-6 particles (Arkema Industries)
Orgasol ® 2002D is polyamide-12 particles (Arkema Industries)
Vestosint ® Z2640 is polyamide-10-10 particles (Evonik Industries)

For resin system 6, the epoxy resin precursors MY0510 and PY306 were heated to 70° C. and mixed thoroughly. The PES5003P toughening agent was added at 70° C. and slurried for 20 minutes, and the temperature of the mixture then increased to 125° C. until complete dissolution. The mixture was then cooled to 80° C., and the curing agent (4,4'-DDS) then added at 80° C., and the mixture slurried for a further 25 minutes at that temperature.

For resin systems 7, 8 and 9, the epoxy resin precursors MY0510 and PY306 were heated to 70° C. and mixed thoroughly. Three quarters of the PES5003P toughening agent was added at 70° C. and slurried for 20 minutes, and the temperature of the mixture then increased to 125° C. until complete dissolution. The mixture was then cooled to 80° C., and the last quarter of the PES5003P toughening agent added at 80° C. and the mixture slurried for 15 minutes at that temperature. The curing agent (4,4'-DDS) was added at 80° C., and the mixture slurried for a further 15 minutes at that temperature. The particles (Orgasol1002D or Orgasol2002D or VestosintZ2640) were added at 80° C. and slurried until full dispersion was achieved.

The compositions so produced were then filmed to an aerial weight of 25.5 gsm on support paper. Intermediate modulus (IM) carbon fibres were spread in a pre-preg machine to an aerial weight of 190 gsm. The resin films were then applied to each side of the spread fibres to obtain a pre-preg with a fibre areal weight (FAW) of 190 gsm, and a resin content of 35% by weight.

To manufacture laminate 3, the films made out of resin 6 were applied to each side of the spread IM fibres followed by the application of the films made out of resin 7 to obtain a pre-preg with a fibre areal weight of 190 gsm and a resin content of 34% by weight.

To manufacture laminate 4, the films made out of resin 6 were applied to each side of the spread IM fibres followed by the application of the films made out of resin 8 to obtain a pre-preg with a fibre areal weight of 190 gsm and a resin content of 34% by weight.

To manufacture laminate 5, the films made out of resin 6 were applied to each side of the spread IM fibres followed by the application of the films made out of resin 9 to obtain a pre-preg with a fibre areal weight of 190 gsm and a resin content of 34% by weight.

The laminates were then cured at 180° C. using a cure ramp rate of either 2° F./min (1.1° C./min) or 4° F./min (2.2° C./min). The laminates were then tested according to the procedures described herein, and the results shown in Table 6 below.

TABLE 6

| Property | | Temperature ramp | Laminate 3 (1002D) measured | Laminate 4 (2002D) measured | Laminate 5 (Z2640) measured |
|---|---|---|---|---|---|
| CSAI (ksi) | 270 in-lb | 2° F./min | 43 | 49 | 52 |
| ENF (in-lb/in$^2$) | $G_{IIC}$ 1st crack | | 5.0 | 14.1 | 14.5 |
| | $G_{IIC}$ average | | 4.0 | 13.7 | 14.3 |
| ENF (in-lb/in$^2$) | $G_{IIC}$ 1st crack | 4° F./min | 3.7 | 7.6 | 15.0 |
| | $G_{IIC}$ average | | 3.4 | 6.1 | 14.6 |

The results in Table 6 demonstrate that the cured laminates 4 and 5 containing the long chain PA particles (PA12 and PA10-10) exhibit increased CSAI and $G_{IIC}$ performances, relative to the cured laminate 3 containing the short chain PA-6 particles.

The results in Table 6 further demonstrate that toughening a resin with a lower cross-link density cured by the low-reactivity 4,4'-DDS with PA12 particles (wherein the temperature of melting ($T_{PA}$) is lower than the nominal cure temperature $T_C$) results in a lack of robustness to variation in cure temperature ramp rates. This is best illustrated by the drop in $G_{IIC}$ performances at faster heating rates by laminate 4.

The results in Table 6 further demonstrate that, when using a resin with a lower cross-link density cured by the low-reactivity 4,4'-DDS, then the selection of PA10-10 particles (wherein the temperature of melting $T_{PA}$ is higher than the nominal curing temperature $T_C$) provides a resin system which is robust to variation in cure temperature ramp rates. This is best illustrated by the $G_{IIC}$ robustness to faster heating rates displayed by laminate 5. In this case, $T_{GEL}=T_C<T_{PA}$.

According to the present invention, therefore, PA10-10 is the preferred polyamide for lower cross-link density resins cured by relatively lower reactivity curing agents such as 4,4'-DDS, when cured at the preferred nominal cure temperature $T_C$ in the range of from 170° C. to 190° C.

The invention claimed is:

1. A process for producing a cured composite comprising the steps of:
   (i) forming a resin composition comprising a tri-functional epoxy resin precursor and/or a tetra-functional epoxy resin precursor, 4,4'-diaminodiphenyl sulphone (4,4'-DDS), a toughening agent selected from aromatic polyethersulphones, and particles of polyamide 10,10 having a melting temperature $T_{P4}$,
   (ii) combining said resin composition with reinforcing fibres to form a composite material, and
   (iii) curing the composite material in a cure cycle in which a cure temperature $T_C$ is attained with a cure ramp rate $R_{CR}$ in the range of 0.05° C./min to 3.0° C./min,
   wherein the cure temperature $T_C$ is in the range of 160° C. to about 200° C., and
   wherein the gelation of the epoxy composition during the cure cycle occurs at a gelation temperature $T_{GEL}$ which is below $T_{P4}$.

2. The process according to claim 1, wherein said cure ramp rate $R_{CR}$ is in the range of 0.05° C./min to 2.5° C./min.

3. The process according to claim 1, wherein the cure temperature $T_C$ is in the range of from 170° C. to 190° C.

4. The process according to claim 1, wherein said tri-functional epoxy resin precursor is O,N,N-triglycidyl-para-aminophenol (TGPAP) or O,N,N-triglycidyl-meta-aminophenol (TGMAP); and said tetra-functional epoxy resin precursor is N,N,N',N'-tetraglycidyldiaminodiphenylmethane (TGDDM).

* * * * *